(12) United States Patent
Seike (10) Patent No.: US 9,910,315 B2
(45) Date of Patent: Mar. 6, 2018

(54) POLARIZING LIQUID CRYSTAL ALIGNMENT LAYERS AND DISPLAY

(71) Applicant: EMPIRE TECHNOLOGY DEVELOPMENT LLC, Wilmington, DE (US)

(72) Inventor: Aya Seike, Tokyo (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 140 days.

(21) Appl. No.: 14/889,556

(22) PCT Filed: May 8, 2013

(86) PCT No.: PCT/US2013/040071
§ 371 (c)(1),
(2) Date: Nov. 6, 2015

(87) PCT Pub. No.: WO2014/182292
PCT Pub. Date: Nov. 13, 2014

(65) Prior Publication Data
US 2016/0109754 A1    Apr. 21, 2016

(51) Int. Cl.
| | | |
|---|---|---|
| G02F 1/1333 | (2006.01) |
| G02F 1/1335 | (2006.01) |
| G02F 1/1337 | (2006.01) |
| G02F 1/1343 | (2006.01) |

(52) U.S. Cl.
CPC ...... *G02F 1/133528* (2013.01); *G02F 1/1337* (2013.01); *G02F 1/13439* (2013.01); *G02F 1/133514* (2013.01); *G02F 1/133711* (2013.01); *G02F 1/133723* (2013.01); *G02F 2202/36* (2013.01)

(58) Field of Classification Search
None
See application file for complete search history.

(56) References Cited

U.S. PATENT DOCUMENTS

| | | | |
|---|---|---|---|
| 4,595,548 A | 6/1986 | St. Clair et al. |
| 4,603,061 A | 7/1986 | St. Clair et al. |
| 4,645,824 A | 2/1987 | Landis et al. |
| 4,895,972 A | 1/1990 | Stoakley et al. |
| 5,053,480 A | 10/1991 | Koto et al. |
| 5,218,083 A | 6/1993 | Gerber et al. |

(Continued)

FOREIGN PATENT DOCUMENTS

| | | |
|---|---|---|
| CN | 101356470 A | 1/2009 |
| CN | 101909521 A | 12/2010 |
| TW | 200827876 A | 7/2008 |
| WO | 2006093358 A1 | 9/2006 |
| WO | 2008072915 A1 | 6/2008 |

OTHER PUBLICATIONS

"Polyvinyl alcohol," accessed at http://web.archive.org/web/20130303161052/http://en.wikipedia.org/wiki/Polyvinyl_alcohol, last modified on Feb. 26, 2013, 4 pages.

(Continued)

*Primary Examiner* — Richard Kim
(74) *Attorney, Agent, or Firm* — Maschoff Brennan (57) ABSTRACT

Display devices including one or more alignment layers with elongated polarizing agents are disclosed. The alignment layers may be configured to align liquid crystal molecules and polarize light applied to the alignment layers. Methods of making and using the display device are also disclosed, as well as methods of making the alignment layer.

25 Claims, 4 Drawing Sheets

(56) References Cited

U.S. PATENT DOCUMENTS

| | | | |
|---|---|---|---|
| 6,232,428 B1 | 5/2001 | Deets et al. |
| 7,619,712 B2 | 11/2009 | Lai et al. |
| 7,619,819 B2 | 11/2009 | Moon et al. |
| 8,068,387 B2 | 11/2011 | Katsuragawa |
| 8,304,160 B2 | 11/2012 | Minegishi et al. |
| 8,334,086 B2 | 12/2012 | Sawano |
| 2004/0156004 A1 | 8/2004 | Shigeta et al. |
| 2005/0181145 A1 | 8/2005 | Sakano et al. |
| 2006/0028727 A1 | 2/2006 | Moon et al. |
| 2009/0103018 A1 | 4/2009 | Matsumori et al. |
| 2009/0195742 A1 | 8/2009 | Fu et al. |
| 2010/0007624 A1 | 1/2010 | Jiang et al. |
| 2010/0188616 A1 | 7/2010 | Ohmuro et al. |
| 2010/0260983 A1 | 10/2010 | Minegishi et al. |
| 2010/0292610 A1 | 11/2010 | Ishii et al. |

OTHER PUBLICATIONS

"Structure and how to make a liquid crystal display," LCD world: Sharp, accessed at http://web.archive.org/web/20130402053612/http://www.sharp.co.jp/products/lcd/tech/s2_3.html, accessed on Oct. 4, 2015, 3 pages (Machine Translation).

"Successful alignment film mineralization of high-temperature polysilicon TFT LCD panel," Sony Japan, accessed at http://web.archive.org/web/20120107044613/http://www.sony.co.jp/SonyInfo/News/Press/200502/05-007/index.html, posted on Feb. 24, 2005, 3 pages (Machine Translation).

Hoogboom, J., et al., "LCD alignment layers. Controlling nematic domain properties," Journal of Materials Chemistry, vol. 16, pp. 1305-1314 (2006).

International Search Report and Written Opinion for International Application No. PCT/US13/40071, dated Sep. 13, 2013.

POLARIZING LIQUID CRYSTAL ALIGNMENT LAYERS AND DISPLAY

CROSS-REFERENCE TO RELATED APPLICATION

This patent application is a U.S. National Stage Application under 35 U.S.C. § 371 of International Application No. PCT/US2013/040071, filed on May 8, 2013, which is incorporated herein in its entirety.

BACKGROUND

Unless otherwise indicated herein, the materials described in this section are not prior art to the claims in this application and are not admitted to be prior art by inclusion in this section.

Liquid crystal displays typically include a liquid crystal layer disposed between two alignment layers. The alignment layer can align liquid crystal molecules in the liquid crystal layer, which in turn can reorient polarized light transmitted through the liquid crystal layer. A voltage can be applied to realign the liquid crystal molecules and therefore change the orientation of the polarized light. Separate polarizing layers are typically disposed on either side of the alignments layer. By controlling the orientation of the liquid crystal molecules, the amount of light transmitted through both of the polarizing layers can be controlled.

SUMMARY

Some embodiments disclosed herein include a display device. In some embodiments, the display device includes: a first alignment layer, the first alignment layer including elongated polarizing agents aligned within a resin; a second alignment layer; and a liquid crystal layer disposed between the first alignment layer and the second alignment layer.

Some embodiments disclosed herein include a method of making an alignment layer. In some embodiments, the method includes: applying a composition to a substrate to form a layer on the substrate, the composition including one or more resins, or resin precursors thereof, and one or more elongated polarizing agents having a metal at one end; applying a patterned electromagnetic field to the layer to align the polarizing agents in a first direction; and curing the layer to form a cured layer.

Some embodiments disclosed herein include a method of making a display device. In some embodiments, the method includes: providing a first alignment layer disposed on a first transparent conducting layer, the first alignment layer including elongated polarizing agents aligned within a resin; providing a second alignment layer disposed on a second transparent conducting layer, the second alignment layer including elongated polarizing agents aligned within a resin; and disposing a liquid crystal layer between the first alignment layer and the second alignment layer.

Some embodiments disclosed herein include a method of using a display device. In some embodiments, the method can include providing the display device including: a liquid crystal layer; a first transparent conducting layer disposed on one side of the liquid crystal layer; a first alignment layer disposed between the first transparent conducting layer and the liquid crystal layer, the first alignment layer including one or more elongated polarizing agents aligned within a resin; a second transparent conducting layer disposed on a side of the liquid crystal layer opposite the first transparent conducting layer; and a second alignment layer disposed between the second transparent conducting layer and the liquid crystal layer, the second alignment layer including one or more elongated polarizing agents aligned within a resin. The method may also include applying light to a side of the second transparent conducting layer opposite the liquid crystal layer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Figure 1:
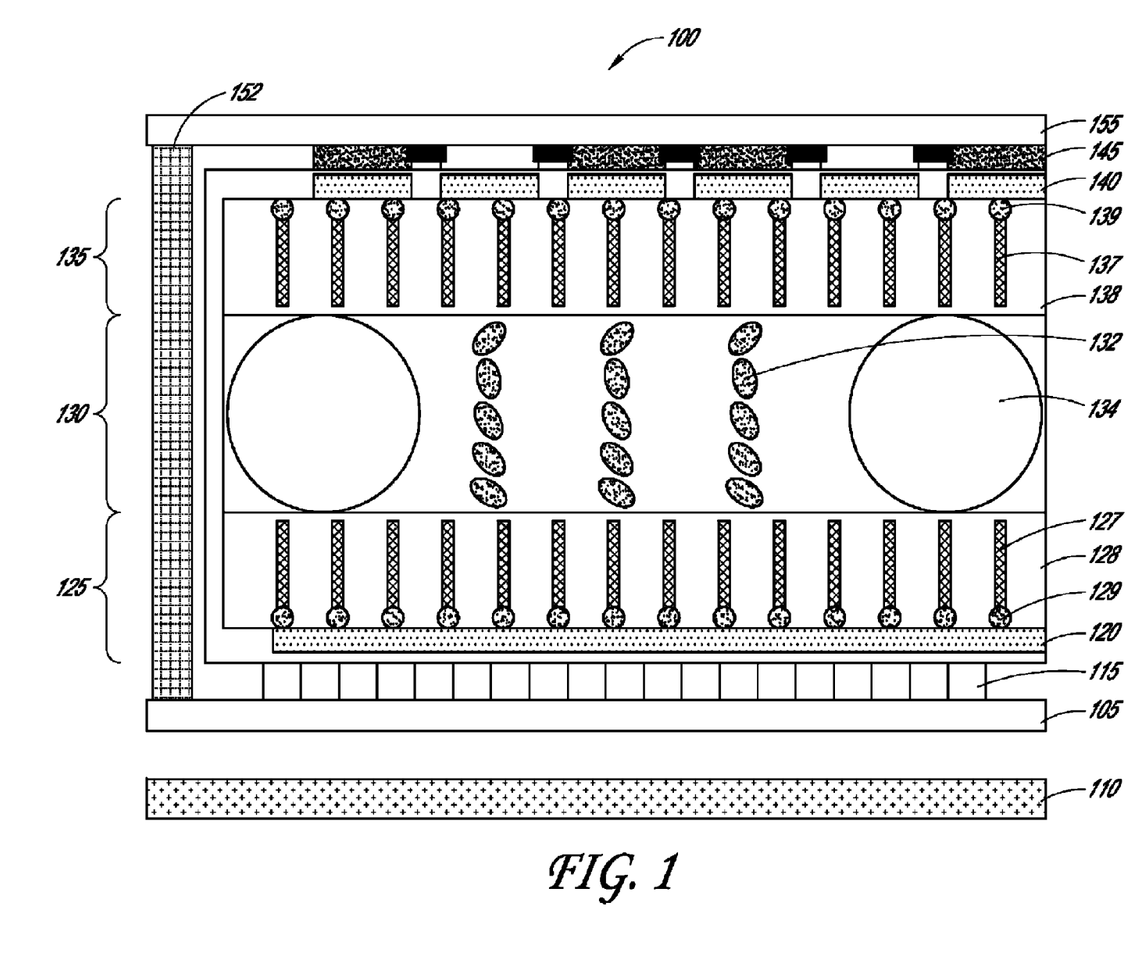
FIG. 1 is a schematic diagram showing some embodiments of a display device that are within the scope of the present application.

Some embodiments disclosed herein include a display device. FIG. 1 is a schematic diagram showing some embodiments of a display device that is within the scope of the present application. Display device 100 includes a transparent substrate 105 disposed between light source 110 and active matrix layer 115. In some embodiments, additional layers can be positioned between the light source and the active matrix layer. Transparent substrate 105 can, for example, include a ceramic (for example, a glass) or polymer (for example, a polycarbonate). Active matrix layer 115 may be a thin film transistor (TFT) or an organic thin film transistor. Light source 110 may, in some embodiments, be configured to emit visible light that is transmitted through transparent substrate 105 and active matrix layer 115. In some embodiments, the light source can be a color cathode or a LED.

First transparent electrode layer 120 can be disposed between active matrix layer 115 and first alignment layer 125. In some embodiments, the two layers can be in facial contact, while in other embodiments, one or more intervening layers can be disposed between the two layers. The first transparent electrode layer is not particularly limited, and may include, for example, one or more of ZnO (for example, AZO and GZO), ZnTiO, $SnO_2$ (for example, ATO and FTO), or $In_2O_3$ (for example, ITO).

First alignment layer 125 can be disposed between liquid crystal layer 130 and first transparent electrode layer 120. In some embodiments, the two layers can be in facial contact, while in other embodiments one or more intervening layers can be disposed between the two layers. First alignment layer 125 can include elongated polarizing agents 127 aligned within resin 128. Elongated polarizing agents 127 can include metal portion 129 at one end. As will be discussed further below, the metal portion may be used to both form and align the elongated polarizing agents 127. The elongated polarizing agents may include a conductive material. In some embodiments, the elongated polarizing agents can include one or more of metal whiskers, metal oxide whiskers, an azobenzene polymer, and carbon nanotubes. In some embodiments, the elongated polarizing agents are single-walled or multi-walled carbon nanotubes. The elongated polarizing agents may, for example, have an aspect ratio of at least about 10, at least about 25, at least about 50, at least about 100, or at least about 500.

Metal portion 129 may include a magnetic metal, such as a ferromagnetic material (for example, iron) or a paramagnetic material (for example, titanium). In some embodiments, the metal portion can be a catalytic particle from which a nanowire (for example, a carbon nanotube) has been catalytically grown. For example, chemical vapor deposition can be used to yield a carbon nanotube extending from a catalytic iron particle.

Resin 128 is not particularly limited, and can be selected so that light emitted from light source 110 can be transmitted through resin 128. Non-limiting examples of suitable resins include one or more of a polyimide, a polyamide, and an epoxy. The resin can be a thermosetting resin or a thermoplastic resin. As an example, the resin can be a polyimide obtained by polymerizing two or monomers that include a dianhydride and an aromatic diamine.

First alignment layer 125 can be configured to polarize light that is transmitted through first alignment layer 125. In particular, elongated polarizing agents 127 can be oriented and patterned in a manner that polarizes visible light. The polarizing agents can, for example, be patterned into parallel bands extending in a direction. The spacing between the bands can be effective to polarize the light. For example, the spacing can be less than about 700 nm or less than about 400 nm. In some embodiments, the spacing can be between about 700 nm and 400 nm. In some embodiments, the spacing can be, for example 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, or more nm, including any range between any two of the preceding values and any range beneath any one of the preceding values. In some embodiments, the spacing is such as to filter a desired wavelength of light.

Liquid crystal layer 130 can be disposed between second alignment layer 135 and first alignment layer 125. In some embodiments, the liquid crystal layer can be in facial contact with one or both of the other layers, while in other embodiments one or more intervening layers can be disposed between the liquid crystal layer and one or both of the other layers. Generally, any known liquid crystal layer can be used. As shown in FIG. 1, liquid crystal layer 130 can include liquid crystal molecules 132 and spacer sections 134. The liquid crystal molecules can be, for example, twisted nematic liquid crystals, such as cyano-biphenyls.

Second alignment layer 135 can also include elongated polarizing agents 137 having metal portion 139 at one end. Elongated polarizing agents 139 may be oriented within resin 138. Second alignment layer 135 may generally have the same characteristics as first alignment layer 125. For example, elongated polarizing agents 127 in first alignment layer 125 and elongated polarizing agents 137 in second alignment layer 135 may both be carbon nanotubes. However, in some embodiments, elongated polarizing agents 127 can be different than elongated polarizing agents 137.

Second alignment layer 135 can be configured to polarize light that is transmitted through second alignment layer 135. In particular, elongated polarizing agents 137 can be oriented and patterned in a manner that polarizes visible light. In some embodiments, the alignment layers can be configured to polarize UV and/or IR wavelengths of radiation. The polarizing agents may, for example, be patterned into parallel bands extending in a direction. The spacing between the bands effectively polarizes the light. For example, the spacing can be less than about 700 nm or less than about 400 nm. In some embodiments, the spacing can range from about 700 nm to about 400 nm. In some embodiments, the spacing can be, for example 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, or more nm, including any range between any two of the preceding values and any range beneath any one of the preceding values. In some embodiments, the spacing is such as to filter a desired wavelength of light. In some embodiments, second alignment layer 135 can be configured so that polarized light produced by first alignment layer 125 cannot transmit through second alignment layer 135 unless the polarized light is reoriented by liquid crystal molecules 132. In some embodiments, second alignment layer 135 can be configured so that polarized light produced by first alignment layer 125 transmits through second alignment layer 135 without reorienting the polarized light. In some embodiments, elongated polarizing agents 127 in first alignment layer 125 are aligned in a different direction than (for example, approximately perpendicular to) elongated polarizing agents 137 in second alignment layer 135.

Both first alignment layer 125 and second alignment layer 135 can function to align liquid crystal molecules 132 in liquid crystal layer 130. In some embodiments, the elongated polarizing agents can be configured so that the liquid crystal molecules align at the surface of the alignment layer. For example, the polarizing agents may be patterned in parallel bands extending in a direction. The spacing between the parallel bands may permit the liquid crystal molecules to position between the bands and align in the same direction as the bands.

The skilled artisan, guided by the teachings of the present application, will appreciate that first alignment layer 125 and second alignment layer 135 may each function as both an alignment layer and a polarizing layer. Accordingly, in some embodiments, unlike typical display devices, display device 100 does not require a polarizing layer that is separate from the alignment layers. This configuration can simplify and/or reduce the thickness of the display device and/or number of manufacturing steps. Thus, in some embodiments, a liquid crystal display device is provided that lacks a separate polarizing and/or alignment layer. In some embodiments, a liquid crystal display is provided that has a combined polarizing and alignment layer.

Second transparent electrode layer 140 can be disposed between color filtering layer 145 and second alignment layer 135. In some embodiments, the transparent electrode layer can be in facial contact with one or both of the other layers, while in other embodiments one or more intervening layers can be disposed between the transparent electrode layer and one or both of the other layers. Second transparent electrode layer 140 is not particularly limited, and may include, for example, one or more of ZnO (for example, AZO and GZO), ZnTiO, $SnO_2$ (for example, ATO and FTO), or $In_2O_3$ (for example, ITO). Second transparent electrode layer 140 may have the same or different material than first transparent electrode layer 120. First transparent electrode layer 120, second transparent electrode layer 140, and active matrix layer 120 may be together configured to adjust a voltage applied to liquid crystal layer 130. The adjusted voltage may change an amount of light emitted from light source 110 that is transmitted through portions of liquid crystal layer 130. In some embodiments, there need not be a color filter layer that is separate from the first and/or second alignment layers (135 and/or 125). In some embodiments, the first and/or second alignment layers can function as the color filter, by arranging the layers so that color is selectively passed through the alignment layer(s).

Optional color filtering layer 145 can be disposed between transparent substrate 150 and transparent electrode layer 140. In some embodiments, the color filtering layer can be in facial contact the other layer or substrate, while in other embodiments one or more intervening layers can be disposed between the color filtering layer and the other layer or substrate. The color filtering layer can include a pattern of color filtering sections within a black matrix configured to prevent light from leaking between color filtering sections. By selectively directing light to different color filtering sections, the color of light transmitted through the display device can be adjusted. Although the color filtering layer is shown disposed between the transparent substrate and the second alignment layer, the skilled artisan, guided by the teachings of the present application, will appreciate that the color filtering layer can disposed in different regions of the display device. The color filtering layer may, in some embodiments, be configured to receive light emitted from the light source. Thus, for example, the color filtering layer may be disposed at any location between the transparent substrate 150 and light source 110. In some embodiments, the first and/or second alignment layer can serve as a color filtering layer, by specifically setting the distance between the bands to effectively filter various colors of light from the light passing through the alignment layer(s).

Transparent substrate 155 is not particularly limited, and can generally be any transparent substrate that transmits visible light. For example, the second transparent substrate can be a glass, plastic, organic layer, and/or quartz. Transparent substrate 155 can be the same or different than transparent substrate 105. In some embodiments, as the polarizing and alignment layers are combined, the thickness of the substrates can be increased to provide additional strength to the device. In some embodiments, as the polarizing and/or alignment layer(s) can be formed magnetically, they can be formed with the creation of the rest of the device (or other associated layers) and need not be formed separately and then combined with the device.

Liquid crystal molecules 132 may be maintained between first alignment layer 125 and second alignment layer 135 by sealant 152. U.S. Patent Publication No. 2005/0181145 suggests suitable sealant materials and procedures that may be used to form sealant 152. Other suitable sealant materials and procedures can be used without limitation.

The skilled artisan, guided by the teachings of the present application, will appreciate that the first alignment layer and second alignment layer each function as both an alignment layer and a polarizing layer. However, in some embodiments, the device may include only one alignment layer that functions as both a polarizing layer and an alignment layer. For example, second alignment layer 135 may be replaced with a standard alignment layer (for example, a polyimide film having nanostructures formed by rubbing) and a standard polarizing layer (for example, stretched polyvinylalchohol (PVA) with iodine). However, when both the first and second alignment layers are as provided in various embodiments described herein, then the device can be formed without a rubbing process, which is otherwise commonly employed.

Various other modifications to the display device may be used without departing from the scope of the present application. For example, active matrix layer 115 may be disposed between transparent substrate 155 and second alignment layer 135, rather than the location depicted in FIG. 1. In some embodiments, the active matrix layer can be in facial contact with the other layer or substrate, while in other embodiments one or more intervening layers can be disposed between the active matrix layer and the other layer or substrate. As another example, the display device may be configured to include a passive matrix, and therefore an active matrix layer is optional.

Some embodiments disclosed herein include a method of using a display device. The method can include providing a display device. The display device can be, in some embodiments, any of the display devices disclosed in the present application. For example the display device can be display device 100 as depicted in FIG. 1. In some embodiments, the display device includes: a liquid crystal layer; a first transparent conducting layer disposed on one side of the liquid crystal layer; a first alignment layer disposed between the first transparent conducting layer and the liquid crystal layer, the first alignment layer having one or more elongated polarizing agents aligned within a resin; a second transparent conducting layer disposed on a side of the liquid crystal layer opposite the first transparent conducting layer; and a second alignment layer disposed between the second transparent conducting layer and the liquid crystal layer, the second alignment layer having one or more elongated polarizing agents aligned within a resin. In some embodiments, the method can include applying light to a side of the second transparent conducting layer opposite the liquid crystal layer. The method may optionally include adjusting a voltage between the first transparent conducting layer and the second transparent conducting layer to modulate an amount of the applied light transmitted through the display device. In some embodiments, the method is performed on a system that employs a layer that serves as both a polarizing layer and an alignment layer. In some embodiments, the method involves using a single layer to serve both alignment functionality and polarizing functionality. In some embodiments, the noted layer can serve as a color filter layer as well. As used herein, unless otherwise specified, the term "disposed between" denotes both the option of a structure being in facial contact with two surrounding structures, as well as embodiments in which additional layers or structures are positioned between the surrounded structure and the surrounding structures.

Figure 2A:
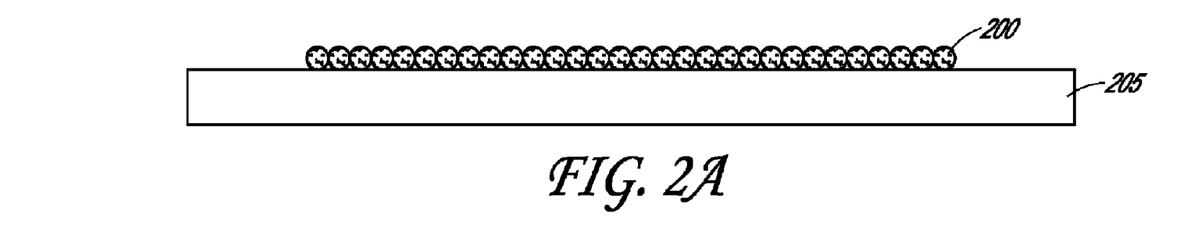
FIGS. 2A-2G show some embodiments of a method of making an alignment layer that is within the scope of the present application.

Some embodiments disclosed herein include a method of making an alignment layer. The method may be used, for example, to prepare first alignment layer 125 or second alignment layer 135 of display device 100 as depicted in FIG. 1. FIGS. 2A-G show some embodiments of a method of making an alignment layer that is within the scope of the present application. As shown in FIG. 2A, catalytic particles 200 can be disposed on substrate 205. In some embodiments, the particles are in direct, facial contact with the substrate, in other embodiments, one or more intervening layers can be positioned between the substrate and the particle. Catalytic particles 200 may be, for example, nanoparticles including one or more of gold, molybdenum, zinc, silver, copper, iron, nickel, and cobalt. In some embodiment, the catalytic particles include a metal. In some embodiment, the catalytic particles are magnetic. The size of catalytic particles 200 may determine the diameter of the elongated polarizing agents that are produced using the method. Thus, in some embodiments, catalytic particles 200 are approximately mono-disperse in size (for example, no more than about 10% variation in diameter). Substrate 205 is not particularly limited, and may be, for example, silicon, glass, or other substrates that are compatible with the process temperatures and conditions for growing nanowires.

Figure 2B:
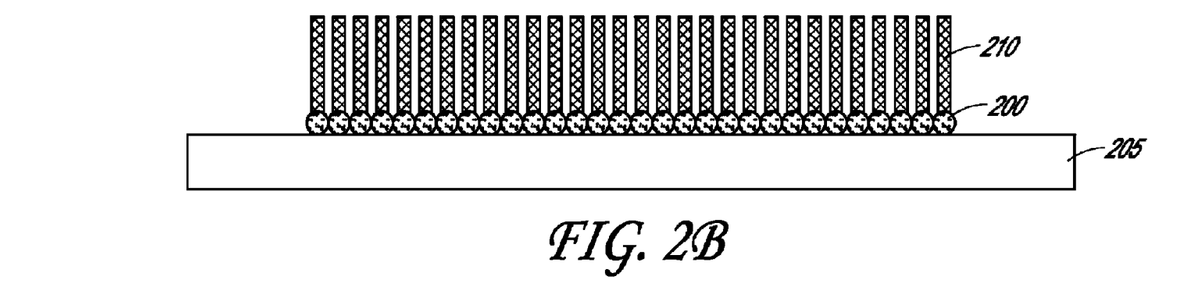

As shown in FIG. 2B, nanowires 210 can be grown from catalytic particles 200. The nanowires can be grown using standard techniques, such as chemical vapor deposition or laser ablation. In some embodiments, nanowires 210 are carbon nanotubes. In some embodiments, the nanowires can be metal whiskers or metal oxide whiskers.

Figure 2C:
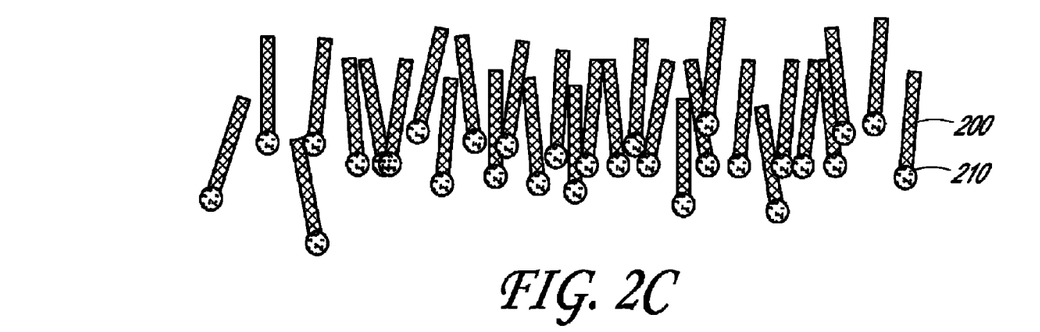

At FIG. 2C, nanowires 210 and catalytic particles 205 can be removed from substrate 205. For example, nanowires 210 and catalytic particles 205 can be dispersed in an appropriate solvent to remove them from the substrate 205.

Figure 2D:
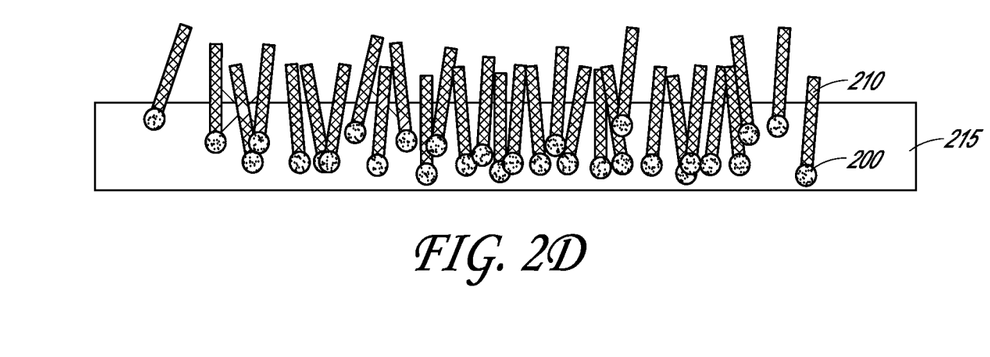

Nanowires 210 and catalytic particles 205 can be disposed within resin 215 to form a mixture as shown in FIG. 2D. For example, the nanowires can be dispersed within a resin and applied to a substrate using, for example, spin coating or spraying. In some embodiments, the resin can be a polyimide, a polyamide, an epoxy, or a precursor thereof. For example, the resin can include a dianhydride and an aromatic diamine that are precursors for forming a polyimide.

Figure 2E:
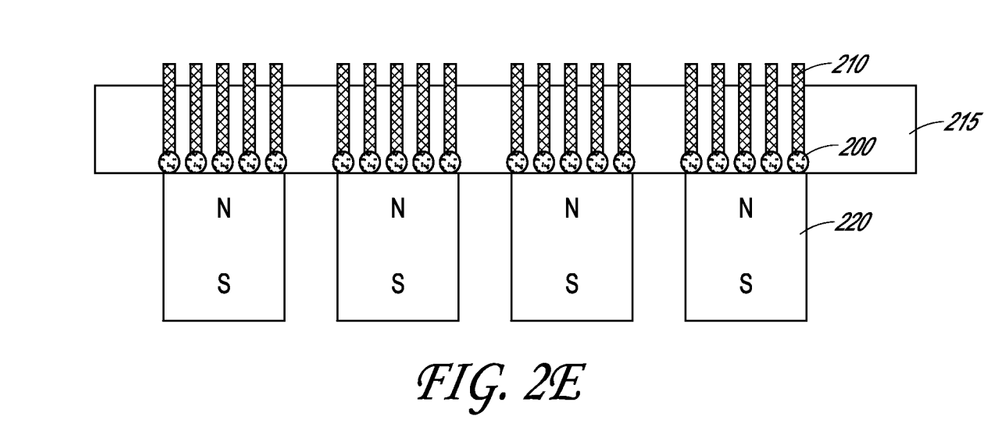

As shown in FIG. 2E, patterned electromagnetic field 220 can be applied to catalytic particles 205 to pattern nanowires 210 within resin 215. For example, the electromagnetic field can be configured so that the nanowires arrange in straight bands extending in a direction (for example, out of the page as depicted in FIG. 2E). The electromagnetic field may be configured so that the nanowires are arranged in a pattern that will polarize light. Thus, as discussed above, the spacing between the bands of nanowires can be smaller than the wavelength of visible light (for example, less than about 700 nm or less than about 400 nm). In some embodiments, the patterns are arranged so as to selectively filter various wavelengths of light, and therefore serve as the color filter for the device as well. Thus, in some embodiments, the spacing between the bands is such as to selectively allow a desired wavelength of light to pass through it. In such embodiments, the device as a whole can include sections spaced appropriately to allow the desired light to pass through the gaps between the bands, proving the desired color in such a manner.

Figure 2F:
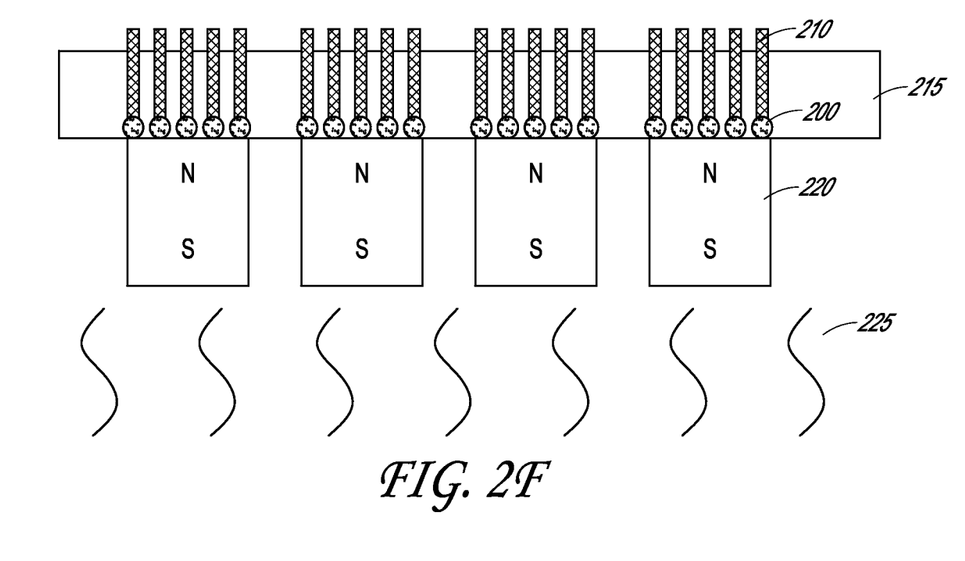

Resin 215 can be cured by applying energy 225 that is effective to cure resin 215 as shown in FIG. 2F. For example, heat or radiation can be applied to cure resin 215 into a cured resin (230, FIG. 2G). As a specific example, an appropriate heat can be applied to a mixture of a dianhydride and an aromatic diamine to form a polyimide. Patterned magnetic field 210 may be optionally applied at the same time as energy 225 to maintain nanowires 210 in the patterned configuration during curing.

Figure 2G:
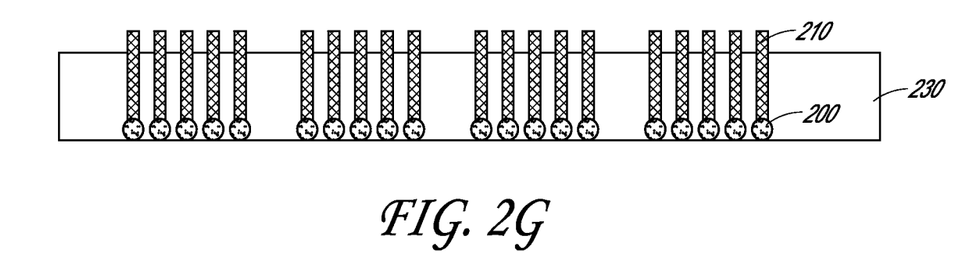

The resulting alignment layer is depicted in FIG. 2G. Nanowires 210 and catalytic particles 200 can be maintained in a patterned configuration within cured resin 230. Nanowires 210 may extend through or near a surface of cured resin 230 to provide a microstructure that is configured to align liquid crystal molecules near the surface. Cured resin 230 can be transparent so that light may be transmitted through the alignment layer and polarized by the nanowires disposed within the resin.

Some embodiments disclosed herein include a method of making a display device. The method may be used, for example, to form any of the display devices disclosed in the present application. For example, the method may be used to form display device 100 as depicted in FIG. 1.

The method may, in some embodiments, include providing a first alignment layer disposed on a first transparent conducting layer (for example, in facial contact with or indirectly connected to), the first alignment layer including elongated polarizing agents aligned within a resin; providing a second alignment layer disposed on a second transparent conducting layer (for example, in facial contact with or indirectly connected to), the second alignment layer including elongated polarizing agents aligned within a resin; and disposing a liquid crystal layer between the first alignment layer and the second alignment layer. As an example, both alignment layers can be prepared using one of the methods disclosed in the present application (for example, the method depicted in FIGS. 2A-G). The alignments layers may, for example, be formed directly on the transparent conducting layer. A liquid crystal layer may then be added dropwise to the surface of one of the alignment layers and then the second alignment layer is brought into contact with the other alignment layer. The two alignment layers can be pressure bonded using a commercially available vacuum laminating apparatus. In some embodiments, additional layers can be provided between the alignment layers and the transparent conducting layers.

Some embodiments disclosed herein include a composite. The composite may be used as a pre-fabricated component for preparing any of the display devices disclosed in the present application. The composite may include an alignment layer disposed on one side of a transparent electrode. In some embodiments, the layer and electrode can be in facial contact with one another, in other embodiments, there can be an intervening layer or structure between the two. Any of the alignment layers disclosed in the present application may be used. For example, the alignment layer may include elongated polarizing agents disposed within a resin. In some embodiments, the elongated polarizing agents include a metal portion at one end of the elongated polarizing agents. The composite may be pre-fabricated and subsequently used in a process for making a display device. By pre-fabricating the composite, the number of manufacturing steps for the display device may be reduced. The composite may optionally include an active matrix layer, where the transparent electrode layer is disposed between the active matrix layer and the alignment layer. In some embodiments, additional layers can be disposed between the electrode layer and the other two layers. The composite may optionally include a color filtering layer, where the transparent electrode layer is disposed between the color filtering layer and the alignment layer. In some embodiments, any of the methods noted herein can avoid having to include (for example, avoid manufacturing) a polarizing layer that is separate from an alignment layer. In particular, in some embodiments, both layers are provided and/or manufactured as a single layer as provided herein. Thus, the methods can avoid having to include two separate layers for each functionality, in some embodiments. Furthermore, in some embodiments, there need be no separate color filter layer, as the single layer can perform this function as well. In some embodiments, the method of making a display device can avoid a rubbing process, as grooves need not be formed in some of the embodiments provided herein.

With respect to the use of substantially any plural and/or singular terms herein, those having skill in the art can translate from the plural to the singular and/or from the singular to volume of wastewater can be received in the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

EXAMPLES

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Example 1

Method of Fabricating an Alignment Layer

Carbon nanotubes are prepared by chemical vapor deposition (CVD) having an iron-based catalyst coupled to one end of the nanotubes. The nanotubes are dispersed in a mixture of a dianhydride and an aromatic diamine. The mixture is applied to a substrate and a patterned magnetic field applied to the mixture to arrange the nanotubes in to parallel bands that are configured to polarize light. The parallel bands are spaced 700 nm apart in one section, 600 nm apart in a second section, and 500 nm apart in a third section. The mixture is heated at 115 degrees Centigradeat about the same time as applying the magnetic field to polymerize the dianhydride and aromatic diamine. The resulting film has patterned carbon nanotubes configured to polarize light and align liquid crystal molecules.

Example 2

Method of Incorporating the Alignment Layer in to a Display Device

A first alignment layer is formed on a first ITO electrode layer using the same techniques described in Example 1. The first ITO electrode layer is disposed on a thin film transistor and a glass substrate.

A second alignment layer is formed on an ITO electrode layer using the same techniques described in Example 1. The second ITO electrode layer is disposed on a color filtering layer and a glass substrate.

A liquid crystal layer may then be added dropwise to the surface of the first alignment layer and then the second alignment layer is brought into contact with the first alignment layer. The two alignment layers can be pressure bonded using a commercially available vacuum laminating apparatus.

Example 3

Method of Using the Alignment Layers

A display device obtained from Example 2 is provided. A voltage across the liquid crystal layer is adjusted to modulate the amount of the applied light that is transmitted through the display device. The voltage is adjusted via the first ITO electrode layer and the second ITO electrode layer. By selecting where light is transmitted, and coordinating it with areas on the display device that contain pigment of a desired color, one can selectively filter light through the pigmented sections. The alignment layer (prepared in the process outlined in Example 1) serves as both an alignment layer and a polarizing layer, thus, a single layer serves both purposes in the method and separate alignment layers and polarizing layers need not be employed.

What is claimed is:

1. A display device comprising:
   a first alignment layer, wherein the first alignment layer comprises elongated polarizing agents aligned within a resin, wherein the elongated polarizing agents each comprises a metal portion at a first end of the elongated polarizing agents and an elongated portion extending from the metal portion, wherein the elongated portion extending from the metal portion does not comprise a metal;
   a second alignment layer; and
   a liquid crystal layer disposed between the first alignment layer and the second alignment layer.

2. The display device of claim 1, wherein the first alignment layer is configured to polarize light that is transmitted through the first alignment layer in a first direction.

3. The display device of claim 2, wherein the second alignment layer is configured to polarize light that is transmitted through the second alignment layer in a second direction.

4. The display device of claim 3, wherein the first direction is different than the second direction.

5. The display device of claim 1, wherein the resin in the first alignment layer is at least one of a polyimide, a polyamide, or an epoxy.

6. The display device of claim 1, wherein the resin in the first alignment layer comprises a polyimide that is obtained by polymerizing monomers including dianhydride and an aromatic diamine.

7. The display device of claim 1, wherein the elongated portion comprises at least one of an azobenzene polymer and a carbon nanotube.

8. The display device of claim 1, wherein the metal portion is magnetized.

9. The display device of claim 1, wherein the second alignment layer comprises elongated polarizing agents aligned within a resin.

10. The display device of claim 9, wherein the elongated polarizing agents in the first alignment layer are aligned in a different direction relative to the elongated polarizing agents in the second alignment layer.

11. The display device of claim 1, further comprising a first transparent conducting layer, wherein the first alignment layer is disposed between the liquid crystal layer and the first transparent conducting layer.

12. The display device of claim 11, wherein the first transparent conductive layer comprises ZnO, $ZnTiO_2$, $SnO_2$, or $In_2O_3$ electrodes.

13. The display device of claim 11, further comprising a color filtering layer, wherein the first transparent conducting layer is disposed between the color filtering layer and the first alignment layer.

14. The display device of claim 13, further comprising a first transparent protective layer, wherein the color filtering layer is disposed between the first transparent protective layer and the first transparent conducting layer.

15. The display device of claim 1, further comprising a second transparent conducting layer, wherein the second alignment layer is disposed between the liquid crystal layer and the second transparent conducting layer.

16. The display device of claim 15, wherein the second transparent conducting layer comprises ZnO, $ZnTiO_2$, $SnO_2$, or $In_2O_3$ electrodes.

17. The display device of claim 15, further comprising an active matrix layer, wherein the second transparent conducting layer is disposed between the active matrix layer and the second alignment layer.

18. The display device of claim 17, further comprising a second transparent protective layer, wherein the active matrix layer is disposed between the second transparent protective layer and the second transparent conducting layer.

19. The display device of claim 1, further comprising a light source, wherein the second alignment layer is disposed between the light source and the liquid crystal layer.

20. The display device of claim 1, wherein the display device does not include a polarizing layer that is separate from the first alignment layer or the second alignment layer.

21. The display device of claim 1, wherein the elongated portion comprises a nanowire.

22. A composite comprising:
    a transparent conducting layer; and
    an alignment layer formed on one side of the transparent conducting layer, wherein the alignment layer comprises one or more elongated polarizing agents aligned within a resin, wherein the one or more elongated polarizing agents each comprises a metal portion at a first end of the one or more elongated polarizing agents and an elongated portion attached to the metal portion, wherein the elongated portion extending from the metal portion does not comprise a metal.

23. The composite of claim 22, wherein the alignment layer is configured to polarize light that is transmitted through the alignment layer.

24. The composite of claim 22, wherein the elongated portion comprises at least one of an azobenzene polymer and a carbon nanotube.

25. The composite of claim 22, wherein the metal portion is magnetized.

* * * * *

UNITED STATES PATENT AND TRADEMARK OFFICE
CERTIFICATE OF CORRECTION

PATENT NO. : 9,910,315 B2
APPLICATION NO. : 14/889556
DATED : March 6, 2018
INVENTOR(S) : Seike Page 1 of 1

It is certified that error appears in the above-identified patent and that said Letters Patent is hereby corrected as shown below:

In the Claims

In Column 11, Line 47, in Claim 1, delete "device" and insert -- device, --, therefor.

In Column 12, Line 59, in Claim 22, delete "composite" and insert -- composite, --, therefor.

Signed and Sealed this
Twenty-fourth Day of July, 2018

Andrei Iancu
*Director of the United States Patent and Trademark Office*